United States Patent [19]

Boudreau et al.

[11] Patent Number: 4,767,085
[45] Date of Patent: Aug. 30, 1988

[54] SYNTHETIC SPEED STABILITY FLIGHT CONTROL SYSTEM

[75] Inventors: Jean A. Boudreau, Long Beach, Calif.; Howard L. Berman, Commack, N.Y.; Jimmie Chin, Flushing, N.Y.; Romeo P. Martorella, Dix Hills, N.Y.

[73] Assignee: Grumman Aerospace Corporation, Bethpage, N.Y.

[21] Appl. No.: 923,243

[22] Filed: Oct. 27, 1986

[51] Int. Cl.[4] .................. B64C 13/18; G05D 1/00
[52] U.S. Cl. .............................. 244/182; 244/195
[58] Field of Search ............ 244/182, 178, 181, 194, 244/195; 364/435, 434, 428

[56] References Cited

U.S. PATENT DOCUMENTS

| 2,766,953 | 10/1956 | Cummings . | |
|---|---|---|---|
| 2,799,461 | 7/1957 | Anderson et al. . | |
| 3,624,364 | 11/1971 | Dommasch . | |
| 3,698,669 | 10/1972 | Miller, deceased . | |
| 3,892,374 | 7/1975 | Lambregts . | |
| 3,908,934 | 9/1975 | Schloeman . | |
| 3,921,941 | 11/1975 | Lehfeldt . | |
| 4,021,009 | 5/1977 | Baker et al. | 364/435 |
| 4,032,093 | 6/1977 | Bonne et al. . | |
| 4,044,975 | 8/1977 | Blechen et al. . | |
| 4,093,158 | 6/1978 | Clears et al. | 244/182 |
| 4,127,248 | 11/1978 | Boone et al. . | |
| 4,189,118 | 2/1980 | Peter-Contesse . | |
| 4,189,119 | 2/1980 | Peter-Contesse et al. . | |
| 4,245,805 | 1/1981 | Stephan . | |
| 4,261,537 | 4/1981 | Tisdale, Sr. et al. . | |
| 4,277,041 | 7/1981 | Marrs et al. . | |
| 4,281,811 | 8/1981 | Nixon . | |
| 4,536,843 | 8/1985 | Lambregts | 244/182 |
| 4,646,243 | 2/1987 | Graupp et al. | 244/182 |

FOREIGN PATENT DOCUMENTS 1154372  6/1969  United Kingdom .

Primary Examiner—Galen Barefoot
Attorney, Agent, or Firm—Pollock, Vande Sande & Priddy

[57] ABSTRACT

A synthetic speed stability subsystem for maintaining the speed and phugoid stability of an inherently unstable aircraft is connected to a main flight control system. The speed stability subsystem uses the pitch and roll angles, and the equivalent air speed of the aircraft for calculating a synthetic speed stability signal, which is fed to the main flight control system, for controlling the stability of the aircraft.

11 Claims, 3 Drawing Sheets

SYNTHETIC SPEED STABILITY FLIGHT CONTROL SYSTEM

FIELD OF THE INVENTION

The present invention relates to flight control systems, and more particularly to a system which includes a speed stability subsystem for maintaining speed stability for an inherently unstable aircraft, perturbations notwithstanding.

BACKGROUND OF THE INVENTION

Conventional aircraft exhibit speed stability due to inherent physical characteristics. An aerodynamically stable airframe with stationary control surfaces will tend to maintain a constant angle of attack. The pilot controls the aircraft about the pitch axis by adjusting the angle of a control surface relative to the airstream. This causes the aircraft to fly at different angles-of-attack, which results in aircraft speed changes.

The tendency of an aircraft to fly at a constant angle-of-attack with fixed controls may be termed angle-of-attack stability. Consider now an aircraft in level flight at constant speed and angle-of-attack with the engine thrust, weight, lift and drag forces in balance. Normally, such an aircraft will speed up or slow down, respectively, with forward or aft control stick deflection and will return to the original speed when the control stick is returned its original position. Also, if the thrust is increased slightly, the aircraft will accelerate, causing increased lift and drag. This results in a climb. Eventually, equilibrium conditions consisting of a steady climb rate with the forward speed approximately equal to the initial speed will be reached. These tendencies of an aircraft to return to the initial speed when disturbed are termed speed stability. This speed stability is usually manifested as an oscillatory interchange of potential and kinetic energies called the phugoid mode. If the phugoid mode damping is positive, speed stability exists.

Modern aircraft designs have included inherently unstable aircraft. To stabilize such an aircraft and give it properties similar to an aircraft with inherent aerodynamic stability requires an aircraft motion feedback loop and the use of reliable full authority fly-by-wire (FBW) flight control systems. However, such FBW systems may not exhibit angle-of-attack stability. In addition, typical FBW control systems utilize rate gyros and accelerometers to provide the artificial stability augmentation. Such systems cause the aircraft to hold a constant pitch angular rate and constant normal acceleration, rather than a constant angle-of-attack. In other words, these systems can give excellent handling qualities for maneuvering flight, but do not provide the long-term speed stability of a conventional aircraft. Such lack of speed stability is undesirable in certain circumstances. For example, on approach to landing, the speed of the aircraft has to be low. As a consequence, it is being operated close to stall speed and a further loss of speed could result in a stall. Hence, speed stability is desirable because it requires increasing the back pressure on the pitch control stick when the aircraft slows, in order to maintain a straight, constant flight path. This cues the pilot to the unsafe condition.

A considerable body of prior art which teaches the use of airspeed feedback loops in aircraft control applications exists. However, none of the prior art addresses the speed stability augmentation for full authority FBW flight control systems or for control of unstable airframes. A case in point is U.S. Pat. No. 3,624,364 issued to Dommasch. In there, the use of airspeed feedback operating through a mechanical clutch is disclosed. However, the Dommasch invention appears to be directed to the stabilization of an aircraft when pilot inputs are not present, since the clutch needs to be disengaged if the pilot is to control the movement of the aircraft. Further, the Dommasch system is not intended to function in conjunction with other vehicle motion sensor feedbacks.

BRIEF DESCRIPTION OF THE PRESENT INVENTION

The present invention overcomes the aforesaid problems by providing a speed stability subcontrol system for providing a reference airspeed signal to the full flight control system for commanding the pitch control surface or surfaces of the aircraft. By means of the pitch command, the aircraft is caused to pitch down if the speed is too slow. Also included in a preferred embodiment of the present invention is a trim network which permits the adjusting of the reference airspeed.

It is, therefore, an object of the present invention to provide a speed stability subsystem for maintaining the angle-of-attack stability (or speed stability) of an inherently unstable FBW controlled aircraft.

It is a further objective of the present invention to provide a speed stability subsystem for maintaining the speed at which an aircraft was originally set to fly.

It is yet another objective of the present invention to provide for the pilot of an aircraft a trim function such that the actual reference speed can be altered within a certain predetermined range.

The above-mentioned objects and advantages of the present invention will become more apparent and the invention itself will be best understood by reference to the following description of an embodiment of the invention taken in conjunction with the accompanying drawings, wherein:

DETAILED DESCRIPTION OF THE INVENTION

Figure 1:
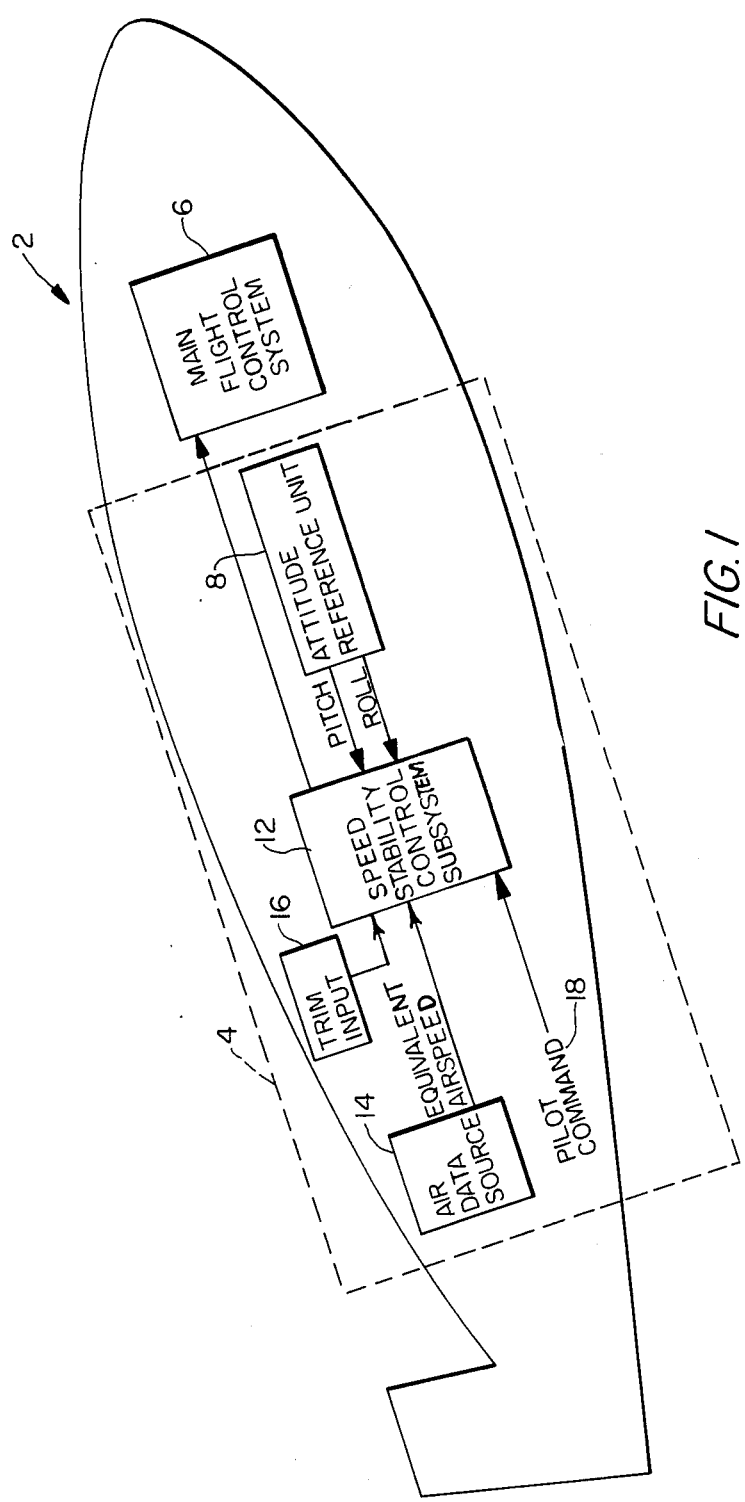
FIG. 1 is a schematic illustration of an inherently unstable aircraft incorporating the speed stability subcontrol system of the present invention.

FIG. 1 schematically illustrates an aircraft 2 having a speed stability flight control subsystem 4 connected to a main flight control system 6. Within the speed stability subcontrol system 4 is attitude reference unit 8 which senses the pitch and roll angles of the aircraft, converts these angles into corresponding signals and feeds these signals into speed stability control subsystem 12. Main flight control system 6 and speed stability control subsystem 12 are shown as being separate entities, for purposes of illustration, but may in fact be part of a single flight control computer system. Into speed stability control subsystem 12 are also sent the equivalent airspeed, which is obtained from air data source 14, and pilot command 18. A trim input 16 provides a signal to bias the equivalent airspeed, before the latter is sent into speed stability control subsystem 12. An output from speed stability control subsystem 12 is sent to main flight control system 6, which is described hereinbelow in FIG. 2.

Figure 2:
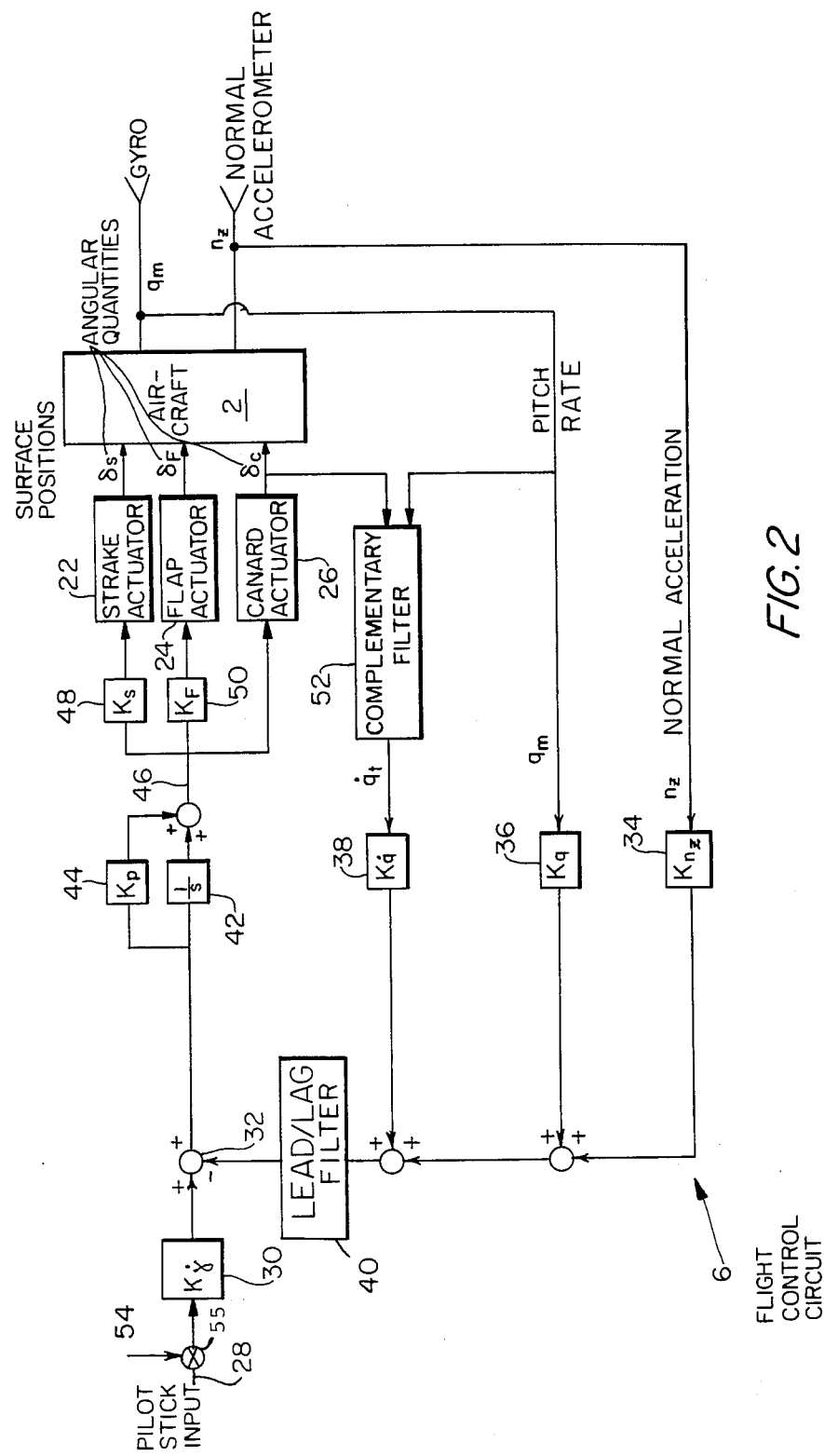
FIG. 2 is a block diagram of the flight control system which has as one of its inputs the output of the speed stability subcontrol system.
Figure 3:
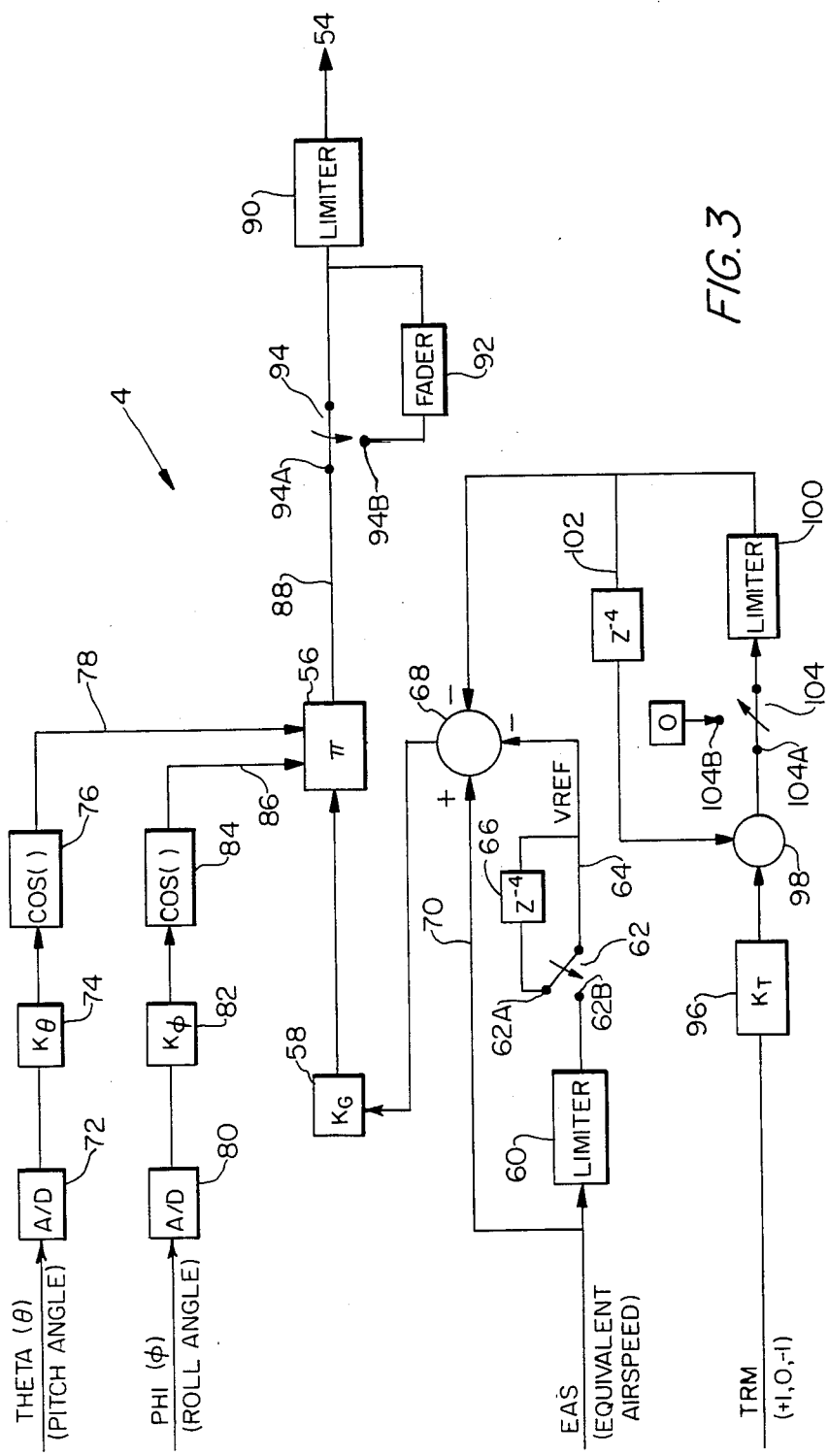
FIG. 3 is a block diagram of the speed stability control subsystem of the present invention.

FIG. 2 shows the flight control system which is illustrated in FIG. 3 of co-pending application: Flight Control System Employing Complementary Filter, Ser. No. 797,089. Flight control circuit 6 is used to drive strake actuator 22, flap actuator 24 and canard actuator 26 of aircraft 2. The inputs with which the actuators are activated comprise the following: a pitch rate signal $q_m$ obtained from a gyro (not shown) is multiplied by gain $K_q$ through amplifier 36; a vertical acceleration signal $n_z$ is multiplied by gain $K_{nz}$ through amplifier 34; a complementary filter output signal $\dot{q}_t$ is multiplied by gain $K_{\dot{q}}$ through amplifier 38; and a pilot stick input 28 is multiplied by gain $K_{\dot{\gamma}}$ in amplifier 30. The output signals from amplifiers 36, 34 and 38 are summed and fed to a lead/lag filter 40. The output signal from the lead/lag filter 40 is summed with the output signal from amplifier 30 at point 32. The output signal from point 32 is integrated by integrator 42, while simultaneously being amplified by amplifier 44 having a gain $K_p$. The resulting signal at 46 is then sent in parallel to amplifier 48 and 50 and multiplied respectively by gains $K_s$ and $K_f$. The output signals from amplifiers 48 and 50 are used to drive respective strake actuator 22 and flap actuator 24. The remaining canard actuator 26 is driven directly by the signal on line 46. An output $\delta_c$ representative of canard angular position from canard actuator 26 is fed to a complementary filter 52, having as an additional input the pitch signal $q_m$. The complementary filter 52 is discussed in the aforesaid co-pending application.

An additional feature in FIG. 2 which was not shown previously and which encompasses the present invention is the input signal 54 going into summation point 55. Signal 54 is fed from the output of speed stability flight control subsystem 4, shown in FIG. 3. The speed stability flight control subsystem, the implementation of which is shown in FIG. 3, allows an inherently unstable aircraft to maintain a phugoid stability during cruising flight.

To maintain the angle-of-attack stability of an aircraft in a substantially level flight, an equivalent airspeed signal EAS is needed. The EAS signal eliminates the differences in pressure and altitude of the aircraft and can be obtained by a number of means. For the present invention, the EAS signal is obtained from an air data source, and is stored in a memory of the digital computer. For example, a specific EAS signal relating to the aircraft flying at Mach 1 at sea level can be obtained from the air data source. The obtained EAS signal is sent to limiter 60, which sets operating limits around the engaged point of the equivalent airspeed. Thus set, limiter 60 allows the pilot to override the system within a certain predetermined range, thus enabling the pilot to have the final say within that predetermined range. The limited EAS signal is sent to switch 62 which, as drawn, shows the speed stability circuit being engaged. (Switch 62 would be connected to point 62B if the speed stability circuit is not engaged). When switch 62 is connected to point 62B, EAS signals are fed continuously to line 64. When switch 62 is disconnected from point 62B and connected to point 62A, no more EAS signals are fed to line 64. Thus, line 64 holds the last EAS signal it has, and this EAS signal becomes the reference equivalent speed signal VREF, which circulates around feedback loop 66 once every fourth iteration cycle of the computer because these computation are performed once during each four iterations. The VREF signal is fed to summer 68 and is subtracted from the EAS signal going into the same summer via line 70. The output signal of summer 68 represents the error between the aircraft equivalent airspeed and the reference equivalent airspeed. This error signal is used to activate the speed stability subsystem. The error signal is multiplied by the loop gain $K_G$ (provided by a look-up table 58) and is a function of Mach number and altitude, depending upon aircraft design.

Pitch angle $\theta$ and roll angle $\phi$ are two other signals which are needed to maintain the aircraft in a stable state for different attitudes. The two angle signals are obtained from attitude reference unit 8, shown in FIG. 1, which is of conventional design. The analog pitch angle $\theta$ is converted into a digital signal by A/D converter 72. The digital $\theta$ signal, after being multiplied by a gain $K_\theta$ at 74, is combined with a cosine function through multiplier 76, before being sent via line 78 to multiplier 56. Similarly, roll angle $\phi$ is converted from an analog signal to a digital signal by means of A/D converter 80, multiplied by a gain of $K_\phi$ at 82 and is modulated by a cosine function through multiplier 84, before being sent via line 86 to multiplier 56. One of the purposes for combining the angle signals by cosine functions is to attenuate gradually the effect of speed stability when the most acute maneuvering angle, for example, 90 degrees, is experienced by the aircraft. A second reason for incorporating cosine functions into the angle signals is to eliminate the speed stability option from operating for large excursions in attitude, if the aircraft is in an inverted position. Hence, the cosine functions in multipliers 76 and 84 provides the necessary information of pitch and roll angles.

These signals are multiplied together in multiplier 56 and fed to line 88. As is apparent from the above discussion, the signal coming out of multiplier 56 represents the error signal between the aircraft equivalent airspeed and the reference airspeed, and the roll and pitch angle compensations. This signal is fed to limiter 90, which limits the signal within a predetermined range. The purpose of limiter 90 is to make sure that the automatic speed stability system does not completely overpower the action of the pilot. For if the range within limiter 90 is greater than the physical displacement of the pilot's control stick, then the pilot would not be able to control the aircraft even if the stick were fully displaced. Signal 54 coming out of limiter 90 is fed to point 55 of FIG. 2, discussed previously. By incorporating signal 54, flight control circuit 6 is able to correct the speed of the aircraft by changing the pitch angle of the aircraft.

It should be noted that a feedback loop comprising a fader 92 and a switch 94 is incorporated into line 88. As shown, switch 94 is connected to point 94A, the speed stability subsystem thus being engaged. If the pilot no longer wants the speed stability subsystem engaged, all he needs to do is to connect switch 94 to point 94B. This disengages the speed stability subsystem from the main flight control system. Fader 92 comprises a first order filter, and it is used to slowly bring the feedback down to zero so that when the pilot switches out of the speed stability mode, the aircraft would not experience a transient.

In order to fine tune the VREF signal, a trim signal TRM, which biases the former, is added to the subsystem. The TRM signal allows the pilot to change the actual reference speed signal VREF without having to disengage the whole system and re-engaging it at a different reference speed VREF. The trim signal is fed into the subsystem by means of a trim button located in the cockpit. By holding down the trim button, the pilot can cause the reference equivalent airspeed to be changed. As shown in FIG. 3, the TRM signal is modified by amplifier 96, having a gain of $K_T$. The signal is then fed to summer 98, where it is combined with the previously entered trim signal which is fed back via feedback loop 102 at every fourth iteration cycle of the computer. The loop acts as a digital integrator. It holds the trim signal when the trim button is not depressed. As long as the pilot continuously holds down the trim button in the cockpit, the trim signal for adjusting the reference equivalent airspeed would continuously increase or decrease in proportion to gain $K_T$, in accordance with the position to which the trim button is pushed. Limiter 100 is used to limit the range of the trim signal. To disengage the subsystem, switch 104 is switched from point 104A to 104B. It should be noted that switches 104, 94 and 62 are ganged. Thus, by activating switch 104, switch 94 is also activated, The switches, besides being operated manually by the pilot, can also be controlled automatically by digital computer 12 such that if the aircraft is going too slowly, the speed stability circuit is automatically engaged.

While a preferred embodiment of the invention is disclosed herein for purposes of explanation, numerous changes, modifications, variations, substitutions and equivalents, in whole or in part, will now be apparent to those skilled in the art to which the invention pertains. Accordingly, it is intended that the invention be limited only by the spirit and scope of the appended claims.

We claim:

1. A flight control system including an air data source for controlling the angle-of-attack stability of an aircraft having at least one control surface, comprising:
    means for obtaining an equivalent airspeed signal of the aircraft from an air data source and generating a reference signal corresponding thereto;
    means for processing the equivalent airspeed signal and the reference signal to generate a synthetic speed stability signal;
    means for inputting the synthetic speed stability signal to actuators of said at least one control surface for maintaining the angle-of-attack stability of the aircraft in a substantially level flight;
    means for sensing pitch angle of the aircraft and generating a signal corresponding thereto;
    means for sensing roll angle of the aircraft and generating a signal corresponding thereto; and
    wherein the processing means multiplies the pitch angle and the roll angle signals as well as the error between the reference equivalent airspeed and the equivalent aircraft speed signals to generate a composite synthetic speed stability signal to be input by the inputting means to the actuators for maintaining the angle-of-attack stability of the aircraft for all attitudes.

2. A flight control system according to claim 1, further comprising:
    means for varying the gain of said processing means in accordance with altitude and Mach number.

3. A flight control system according to claim 1 further comprising:
    means for inputting a biasing signal to the reference equivalent airspeed signal for establishing a new reference signal.

4. A flight control system according to claim 3, wherein said biasing signal is a trim signal.

5. A flight control system according to claim 1, further comprising:
    means for setting the equivalent airspeed between a maximum limit and a minimum limit, thereby enabling biasing of the reference equivalent airspeed signal within the limits.

6. The structure set forth in claim 1, wherein the at least one control surface comprises an aerodynamic pitch control surface.

7. The structure set forth in claim 1, wherein the control surfaces comprise at least one of a strake, a flap, an elevator and a canard.

8. A flight control system including an air data source for controlling the angle-of-attack stability of an aircraft having at least one control surface, comprising:
    means for sensing pitch angle of the aircraft and generating a signal corresponding thereto;
    means for sensing roll angle of the aircraft and generating a signal corresponding thereto;
    means for obtaining an equivalent airspeed of the aircraft from the air data source and generating a reference signal corresponding thereto;
    means for inputting a biasing signal to the reference equivalent airspeed signal for establishing an updated reference signal;
    means for setting the equivalent airspeed between a maximum limit and a minimum limit to enable a pilot to trim the reference equivalent airspeed signal within the limits; and
    means for multiplying the pitch angle, the roll angle, and the updated error between aircraft and reference equivalent airspeed signals to generate a synthetic stability signal for controlling actuators of the at least one control surface of the aircraft.

9. The structure set forth in claim 8, wherein the at least one control surface comprises an aerodynamic pitch control surface.

10. The structure set forth in claim 8, wherein the control surfaces comprise at least one of a strake, a flap, an elevator and a canard.

11. A flight control method for controlling angle-of-attack stability of an aircraft having at least one control surface, comprising the steps of:
    obtaining an equivalent airspeed of the aircraft from an air data source and generating a reference signal corresponding thereto;
    using the error between aircraft and reference equivalent airspeed signals to generate a first synthetic speed stability signal;
    inputting the first synthetic speed stability signal to actuators of each of the control surfaces for maintaining the angle-of-attack stability of the aircraft in a substantially level flight;
    sensing pitch angle of the aircraft and generating a signal corresponding thereto;
    sensing roll angle of the aircraft and generating a signal corresponding thereto; and
    multiplying the first synthetic speed stability signal with the pitch angle and the roll angle signals to generate a composite synthetic speed stability signal for inputting to the actuators to maintain the angle-of-attack stability of the aircraft for all attitudes.

* * * * *

UNITED STATES PATENT AND TRADEMARK OFFICE
CERTIFICATE OF CORRECTION

PATENT NO. : 4,767,085

DATED : August 30, 1988

INVENTOR(S) : Jean A. Boudreau, et al.

It is certified that error appears in the above-identified patent and that said Letters Patent is hereby corrected as shown below:

Column 3, line 26, change "amplifier" to --amplifiers--.

Column 4, line 3, change "computation" to --computations--.

Column 4, line 36, change "provides" to --provide--.

Column 5, line 24, change "activated," to --activated.--.

Signed and Sealed this

Twenty-fourth Day of January, 1989

Attest:

DONALD J. QUIGG

*Attesting Officer*  *Commissioner of Patents and Trademarks*